US011873841B1

(12) United States Patent
Susa et al.

(10) Patent No.: US 11,873,841 B1
(45) Date of Patent: Jan. 16, 2024

(54) INTEGRATED DRIVE BOX AND HEAT EXCHANGER AND SYSTEMS

(71) Applicant: W.S. Darley & Co., Itasca, IL (US)

(72) Inventors: Sheldon Susa, Chippewa Falls, WI (US); Wayne Hable, Chippewa Falls, WI (US); Amanda Normand, Chippewa Falls, WI (US); Jeff Smith, Chippewa Falls, WI (US)

(73) Assignee: W.S. Darley & Co., Itasca, IL (US)

( * ) Notice: Subject to any disclaimer, the term of this patent is extended or adjusted under 35 U.S.C. 154(b) by 0 days.

(21) Appl. No.: 17/746,162

(22) Filed: May 17, 2022

Related U.S. Application Data

(60) Provisional application No. 63/227,828, filed on Jul. 30, 2021.

(51) Int. Cl.
| | |
|---|---|
| F04D 29/58 | (2006.01) |
| F04D 1/00 | (2006.01) |
| F16H 57/04 | (2010.01) |
| F04D 29/06 | (2006.01) |

(52) U.S. Cl.
CPC ........... F04D 29/5866 (2013.01); F04D 1/00 (2013.01); F04D 29/061 (2013.01); F16H 57/0415 (2013.01); F16H 57/0471 (2013.01)

(58) Field of Classification Search
CPC .... F04D 29/06; F04D 29/061; F04D 29/5806; F04D 29/586; F04D 29/5866; F04D 29/5873; F04D 29/588; F16H 57/0412; F16H 57/0415; F16H 57/0416; F16H 57/0471

See application file for complete search history.

(56) References Cited

U.S. PATENT DOCUMENTS

| 2,597,450 | A | * | 5/1952 | Cline ........................ G01L 3/20 |
| | | | | 188/274 |
| 3,217,656 | A | * | 11/1965 | Oakes ................. F16H 57/0412 |
| | | | | 415/180 |
| 5,678,461 | A | | 10/1997 | Stine |
| 6,997,238 | B1 | | 2/2006 | Ruthy et al. |
| 8,678,750 | B2 | | 3/2014 | Seitz |
| 2009/0031722 | A1 | * | 2/2009 | An .......................... F02B 37/16 |
| | | | | 60/600 |
| 2017/0335756 | A1 | * | 11/2017 | Donkin ................. F04D 25/045 |

FOREIGN PATENT DOCUMENTS

| DE | 102018219253 A1 * | 5/2020 | ............. F04D 13/06 |
| JP | 2013181459 | * 3/2013 | |

OTHER PUBLICATIONS

Translation of DE-102018219253-A1 (Year: 2020).*
Translation of JP2013181459 (Year: 2013).*

* cited by examiner

*Primary Examiner* — Brian O Peters
(74) *Attorney, Agent, or Firm* — Anthony J. Bourget

(57) ABSTRACT

Drive casings, heat exchange systems and methods for cooling lubricant within the casings which house within a main cavity of the casing a drive shaft, bearings or gears of an engine-driven apparatus, the casing having an integrated base defining a heat exchanger cavity and separating the heat exchanger cavity from the main cavity, where the base receives cooling liquid within the heat exchanger cavity, a surface of the base within the main cavity defining a main cavity floor which is slanted with respect to a horizontal plane when in normal use.

26 Claims, 5 Drawing Sheets

US 11,873,841 B1

INTEGRATED DRIVE BOX AND HEAT EXCHANGER AND SYSTEMS

CROSS-REFERENCE TO RELATED APPLICATIONS

This application claims the benefit of and priority to, U.S. Provisional Patent Application Ser. No. 63/227,828 filed Jul. 30, 2021 for INTEGRATED DRIVE BOX AND HEAT EXCHANGER AND SYSTEMS, incorporated herein by reference in its entirety for continuity of disclosure.

BACKGROUND OF THE INVENTION

Gearboxes, drive boxes or casings, including those powering fluid pumps, encase various gears, bearings and/or drive shafts used for transferring mechanical power. Generally gears or bearings or shafts within a sealed box or gearbox are surrounded with oil or other lubricant to reduce friction. During operation the transfer of mechanical power produces heat and friction within the box, gearbox, and oil or other lubricant. Excessive heat within the box, especially for prolonged periods can be disastrous, resulting in breakdown of lubricant and failure of the gears, gear exchange, bearings, shaft, and gearbox. Thus, various efforts have been made to reduce the heat within the casing or gearbox.

One system for reducing the heat within the gearbox includes introducing a coolant source directly within the gearbox. Such system may include use of a copper tube inserted within the gearbox cavity. A coolant such as cool water or other cool liquid is pumped, sometimes continuously, through the copper tube which thereby cools the interior of the gearbox.

Other systems, such as the assembly shown in Ruthy et al. under U.S. Pat. No. 6,997,238, pump a cooled fluid to a gearbox cooler plate, through which the cooling fluid cools the casing of the gearbox and thus cools the lubricant within the gearbox. While such examples and systems have benefits, there is room for improvement.

SUMMARY OF THE INVENTION

In one aspect the present invention pertains to a device having a casing defining a main cavity for housing a drive shaft or bearings or gears of an engine-driven apparatus, the casing having a base, the base defining a heat exchanger cavity and separating the heat exchanger cavity from the main cavity, an opening at an external surface of the base providing access to the heat exchanger cavity. The engine-driven apparatus in one instance is a centrifugal firefighting pump. Liquid from the pump in part flows to the heat exchanger cavity to assist in cooling lubricant within the main cavity of the casing. In one aspect the base defines a main cavity floor within the main cavity. The main cavity floor is slanted with respect to a horizontal axis. The present device involves using the pump to cool lubricant used for powering itself.

In further aspects the invention includes a device having a casing defining a main cavity and housing a drive shaft of an engine-driven apparatus, the casing being a one-piece casing and having an integrally connected base, the base defining a heat exchanger cavity and having an internal heat exchange web separating the heat exchanger cavity from the main cavity, an inlet port in communication with the heat exchanger cavity, and an outlet port wherefrom liquid exits the heat exchanger cavity, whereby cooling liquid enters the heat exchanger cavity and contacts the web to exchange heat to cool lubricant within the main cavity. The engine-driven apparatus in one aspect is a centrifugal firefighting pump driven by the shaft. A water supply conduit provides communication between a casing of the pump and the inlet port of the device casing. A plug is positioned at an exterior surface of the base to close access to the heat exchange cavity at a bottom-side of the casing.

A further aspect includes a heat exchange system for cooling lubricant used in a casing configured to drive an engine-driven apparatus such as a centrifugal pump, including a centrifugal pump for pumping liquid, a casing defining a main cavity for housing a drive shaft, bearings, or gears to drive the pump, the casing having an integrally connected base, the base defining a heat exchanger cavity and separating the heat exchanger cavity from the main cavity, and a conduit in communication from a liquid supply port of the pump to a liquid inlet of the base.

In further aspects the invention includes a method of cooling lubricant within a drive shaft casing defining a cavity which houses a drive shaft of an engine-driven apparatus such as a centrifugal pump, including passing water from a casing of the centrifugal pump to an integrally connected base of the drive shaft casing, the base defining a heat exchanger cavity defined in part by a web separating the heat exchanger cavity from the drive shaft cavity.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

Figure 1:
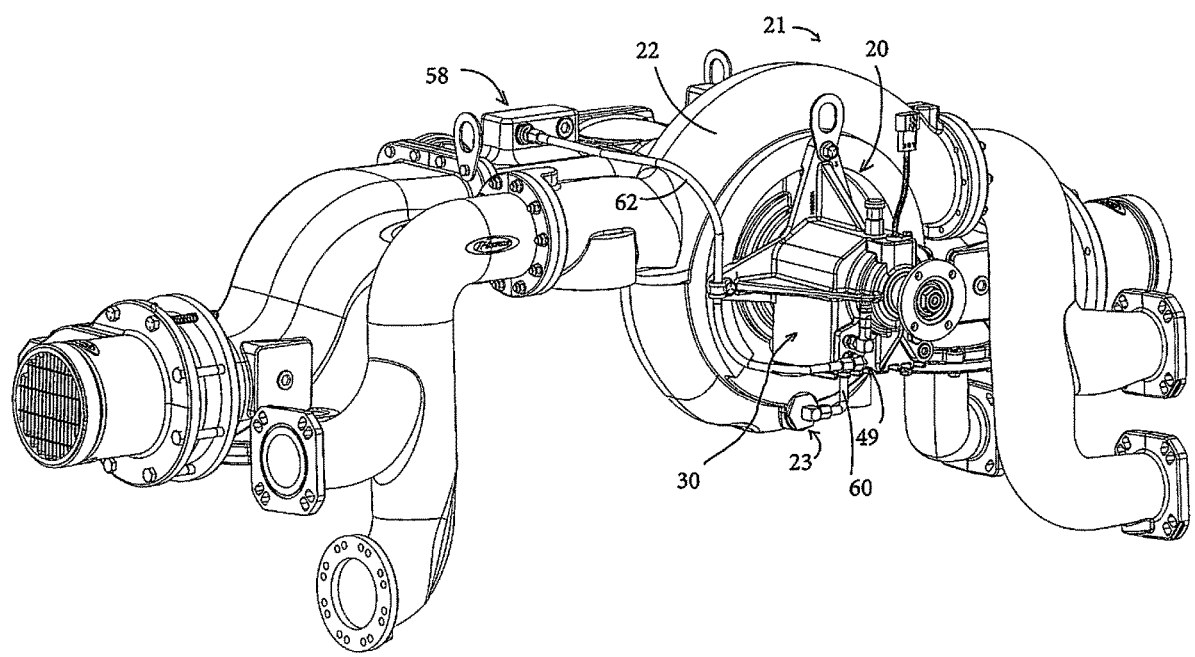
FIG. 1 is a perspective view of a device and system embodiment of the invention together with piping and additional representative components.
Figure 2:
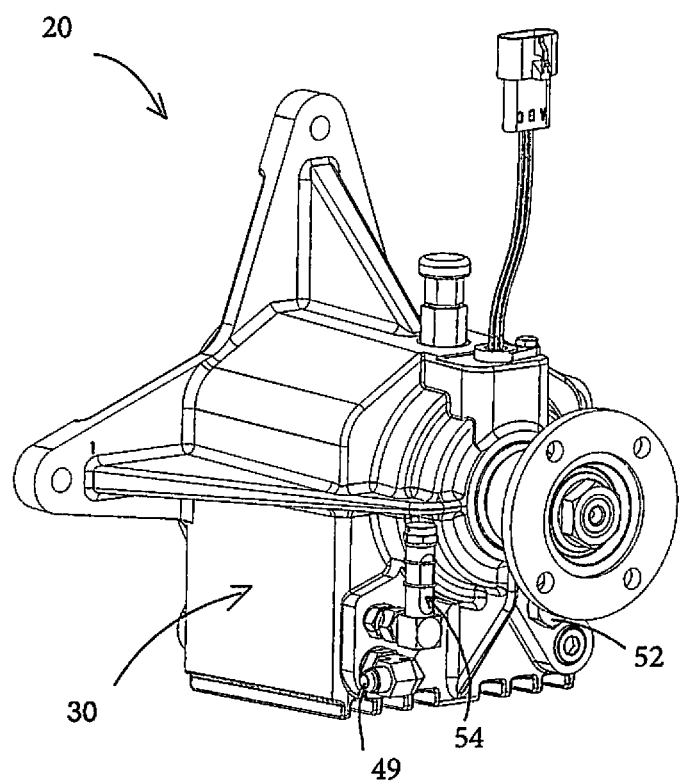
FIG. 2 is a perspective view of the device and system of FIG. 1.

While the invention is amenable to various modifications and alternative forms, specifics thereof have been shown by way of example in the drawings and will be described in detail. It should be understood, however, that the intention is not necessarily to limit the invention of the particular embodiments described.

DETAILED DESCRIPTION OF THE INVENTION

The invention is directed to device 20, system 21 and method aspects for cooling lubricant within casings which house within a main cavity of the casing a drive shaft, bearings or gears of an engine-driven apparatus, such as a centrifugal pump or other apparatus. In one aspect the casing 30 has an integrated base 40 defining a heat exchanger cavity 42 and separating the heat exchanger cavity 42 from a main cavity 32 of the casing 30. The base 40 receives cooling liquid within the heat exchanger cavity 42. In one aspect a surface of the base 40 within the main cavity 32 defines a main cavity floor 46 which is slanted with respect to a horizontal plane H when in normal use.

Figure 3:
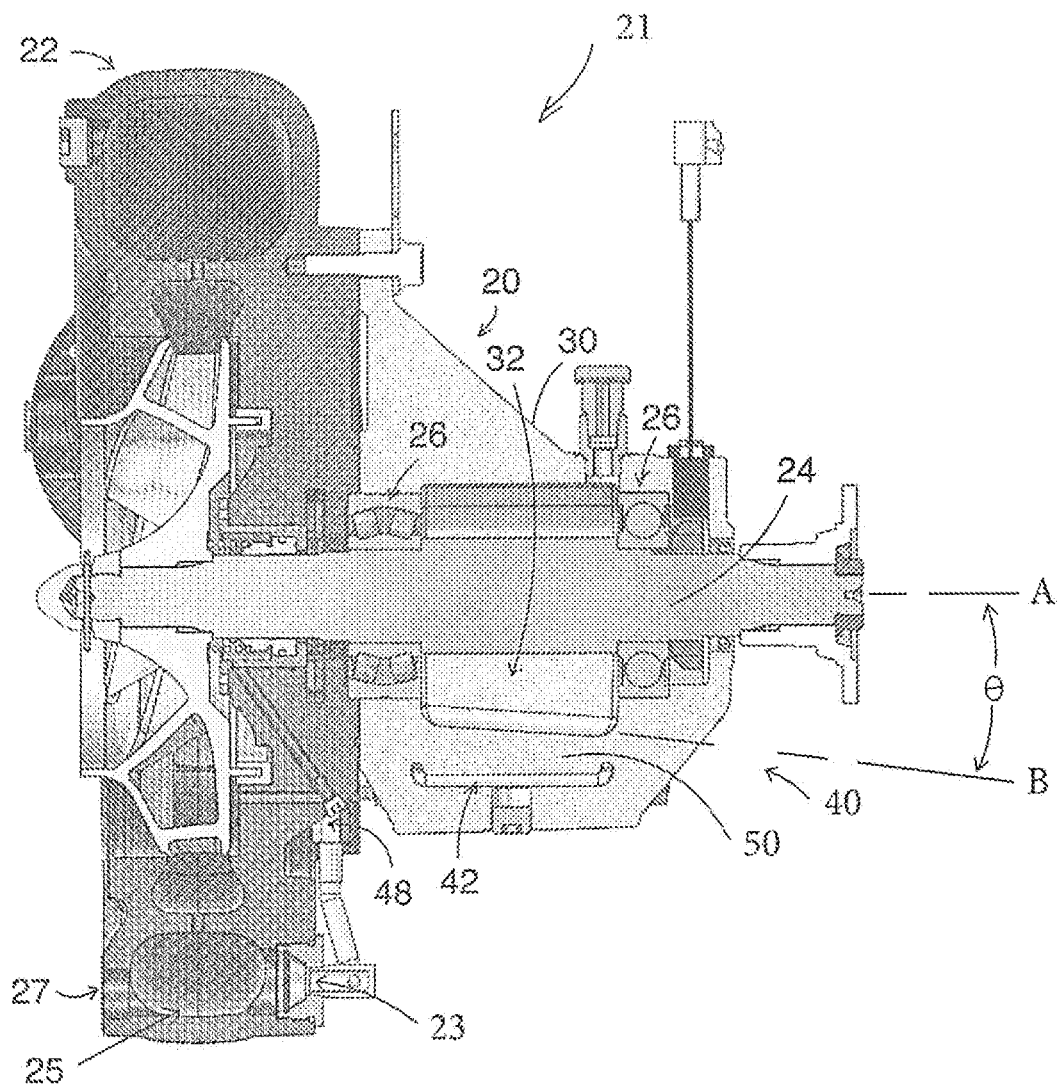
FIG. 3 is a section view a device and system aspect of the invention taken through a central axis of a representative impeller component.

In reference to FIG. 1, device 20 having casing 30 is connected to pump 22. Liquid supply port 23 of pump 22 supplies liquid to base 40 of casing 30 at inlet port 48. FIG. 3 shows base 40 integrally connected as part of device 20 and casing 30. Base 40 defines heat exchange cavity 42. An inlet port 48 receives water from pump 22 via a supply conduit 60 to provide cooling water to casing 30. The cooling water exchanges heat with surfaces of the casing, including with web 50. Web 50 is positioned between main cavity 32 and heat exchange cavity 42. Lubricant within the main cavity 32 rests against main cavity floor 46 and is cooled due to the presence and circulation of water through exchange cavity 42. Exchange cavity is formed within casing 30 during a casting process. Casing 30 in one aspect is a one-piece casting made of cast iron or cast aluminum. Other metals may also be used to cast casing 30. An outlet port 49 connects with return conduit 62 for removal or circulation of the cooling liquid from exchange cavity 42. The conduit 62 feeds the liquid back to piping 58 or input components for reintroduction to pump 22 (see FIG. 5).

Figure 5:
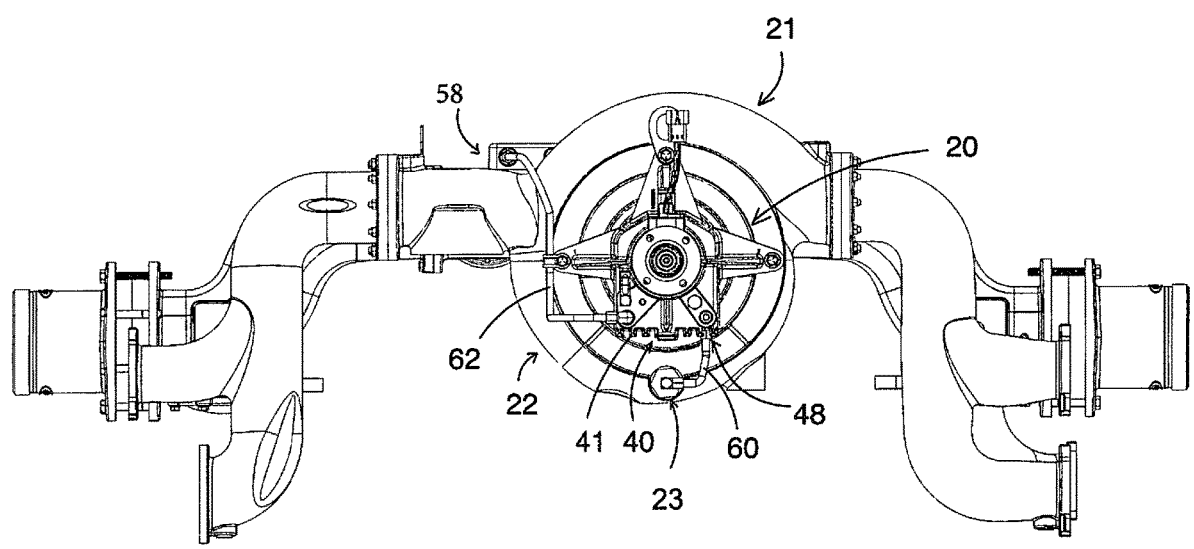
FIG. 5 is a rear view of the device and system of FIG. 1 with additional representative components.

FIG. 5 shows supply conduit 60 providing fluid communication between pump 22 and device 20 at base 40. A lower external portion of base and casing 30 includes a series of fins 41 of further heat exchange. Heat exchange cavity 42 also includes internal fins 43 to provide greater surface area and tortious flow path to provide for greater heat exchange within cavity 42. A plug 45 is used to close opening 44 at a bottom of base 40. Opening 44 is typically closed for and during operation of casing 30 and may be used as a retraction port during a manufacturing process. Additional ports may be presented in base 40 during manufacture and closed for normal operation. Typically a single inlet port 48 and outlet port 49 is utilized to accomplish flow of cooling liquid within cavity 48. Applicant notes that utilization of integrated cavity 42 with supply from pump 22 accommodates ease of maintenance of device 20 and system 21. Special draining of a heat exchanger is accomplished automatically with draining of pump 22, where main pump drain 27 allows for draining of the liquid from both the pump and cavity 42. Lubricant from casing is drained via oil drain plug 52 positioned at a back side 31 of casing 30. Accommodating draining of cavity 42 as noted herein avoids a mistake where a service technician might otherwise forget to drain a heat exchange unit after only draining lubricant from a casing.

Figure 4:
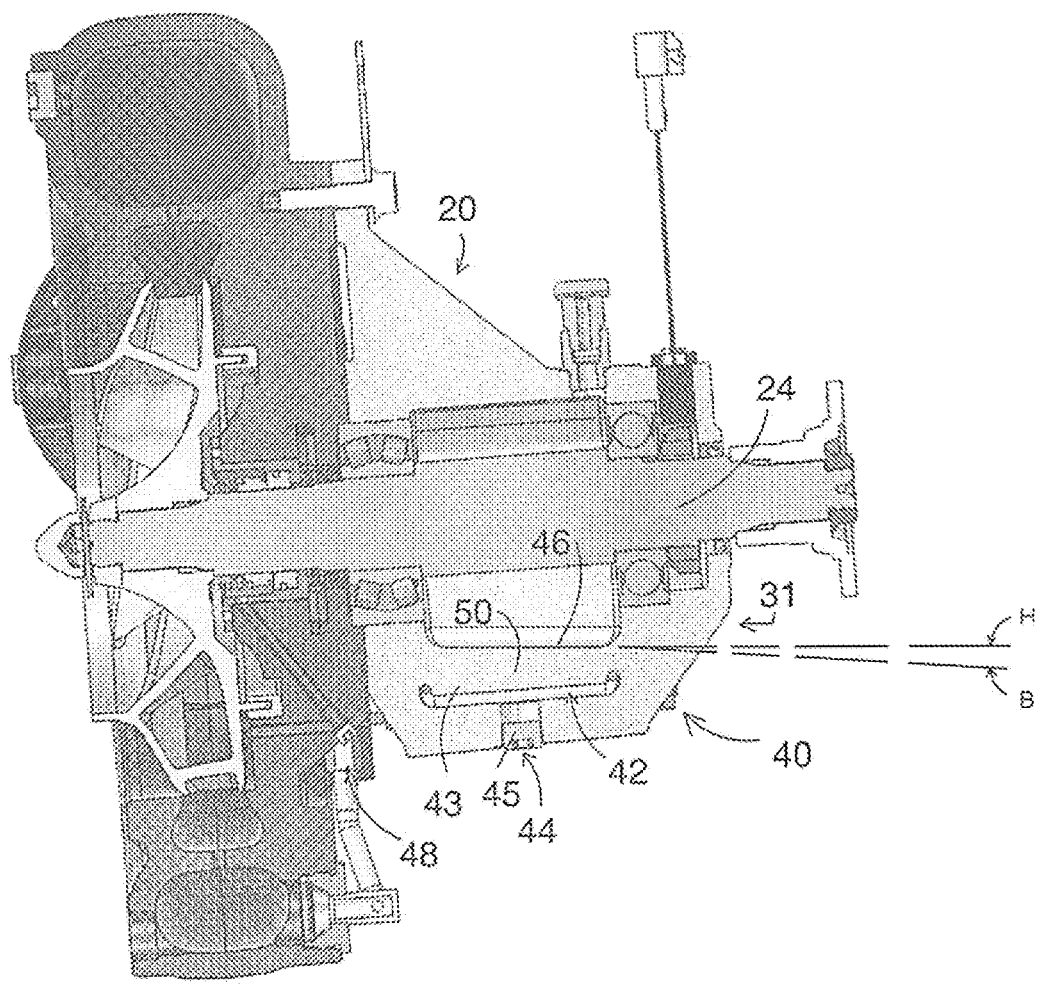
FIG. 4 is a close-up section view of the device and system of FIG. 3.

In a further aspect, the main cavity floor 46 is slanted with respect to the axis A of drive shaft 24 (See FIG. 3). In one aspect cavity floor 46 is slanted at least 4 degrees with respect to axis A. In one aspect cavity floor 46 is slanted about 4.0 to 5.0 degrees. In further aspects cavity floor 46 is slanted at least 1 degree with respect to a horizontal plane H when the device 20 is mounted to a vehicle for operation (See FIG. 4). Thus, if and when device 20 is tipped or mounted, the cavity floor 46 will nonetheless be slanted with respect to a horizontal so that lubricant is gravity fed to or toward oil drain 52. This promotes better draining of all lubricant from main cavity 32 and thus less potential for damage due or wear.

In one aspect system 21 is a system for cooling lubricant used in casing 30 which is configured to drive a centrifugal pump 22. The system 21 includes the pump 22 for pumping liquid, such a firefighting pump or other apparatus. The casing 30 receives the pump 22. The casing is defined by the main cavity 32 for housing the drive shaft 24, bearings 26, or gears in some applications, to drive the pump 22. The base 40 is integrally connected as part of the casing 30, and defines the cavity 48. The base separates main cavity 32 from heat exchange cavity 42. A supply conduit 60 communicates from the liquid supply port 23 of the pump 22 to the liquid inlet 48 of the base 40, and the water circulates throughout the system as noted above and appreciated in the drawings.

To create heat exchange cavity 42, a special casting process is used. Particularly a sand, foam or other molding element is configured in the shape of cavity 42 within the mold used to create casing 20. When casting of casing 20 is completed, the sand, foam or other molding element is removed (or evaporates) through opening 44 or other of the ports, or some of them. It may be appreciated that cavity 42 is casted in place or made using a "cast in place" method. Openings may have been placed in different positions, yet applicant has advantageously positioned the openings at relatively lower areas for draining purposes.

A further aspect of the invention includes a method of cooling the lubricant within the device 20 by passing water from an engine-driven apparatus to an integrally connected base of the casing. In one aspect the apparatus is a pump which circulates water from the pump to the heat exchange cavity 42 of casing 20 which exits casing 20 at outlet port 49 of base 40, a web 50 separates the exchange cavity 42 from the main cavity 32. Passing water from the casing of the centrifugal pump to a base integrally connected to the drive shaft casing which powers the pump cools the lubricant and parts within the casing. The base defines the heat exchanger cavity and with web 50 separates the heat exchanger cavity from the drive shaft cavity.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular devices, systems and methods as herein shown and described in detail are fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A device comprising:
    a casing defining a main cavity for housing a drive shaft or bearings or gears of an engine-driven apparatus, the casing having a base, the base defining a heat exchanger cavity having an inlet and an outlet and separating the heat exchanger cavity from the main cavity, an entirety of the heat exchanger cavity positioned below the main cavity, an opening at an external surface of the base providing access to the heat exchanger cavity.

2. The device of claim 1 where an inner surface of the base defines a main cavity floor within the main cavity.

3. The device of claim 2 where the main cavity is configured to receive a drive shaft defining a central longitudinal axis, the main cavity floor slanted with respect to the axis.

4. The device of claim 3 where the main cavity floor is slanted at least 4 degrees with respect to the axis.

5. The device of claim 3 where the main cavity floor is slanted at least 1 degree with respect to a horizontal plane when the device is mounted to a vehicle.

6. The device of claim 1 where an innermost surface of the base in part defines the main cavity and an exterior-most surface of the base in part defines an exterior surface of the gearbox.

7. The device of claim 1 where the casing is a one-piece casing and where the base is integrally connected to the casing which is made of cast metal.

8. The device of claim 1 where the base includes an integral heat exchange web positioned between the main cavity and the heat exchanger cavity.

9. The device of claim 8 where the heat exchanger cavity is configured to receive cooling liquid which contacts the heat exchange web to cool lubricant within the main cavity.

10. The device of claim 1 where the casing includes an oil drain port in communication with the main cavity and positioned in a spaced relation with respect to an exterior bottom surface of the base, the oil drain port positioned on a back side of the casing.

11. The device of claim 1 where the base includes a heat exchange web positioned between the main cavity and the heat exchanger cavity, the heat exchanger cavity is defined in part by fins projecting downward from the web.

12. The device of claim 1 where a bottom external surface of the base includes downward projecting fins.

13. The device of claim 1 where the opening is positioned at a lowermost external surface of the base in communication with the heat exchanger cavity such that all liquid within the heat exchanger cavity may drain from the heat exchanger cavity by gravity.

14. The device of claim 1 further comprising an oil drain port in communication with the main cavity and positioned above the heat exchanger cavity.

15. A device comprising:
a casing defining a main cavity for housing a drive shaft or bearings or gears of an engine-driven apparatus, the casing having a base, the base defining a heat exchanger cavity having an inlet and an outlet and separating the heat exchanger cavity from the main cavity, an opening at an external surface of the base providing access to the heat exchanger cavity, where the main cavity is configured to receive a drive shaft defining a central longitudinal axis, the heat exchanger cavity defined in part by a heat exchanger cavity floor, the heat exchanger cavity floor oriented substantially parallel with respect to the axis, the main cavity having a lower main cavity floor slanted at least 4 degrees with respect to the axis.

16. A device comprising:
a casing defining a main cavity for housing a drive shaft or bearings or gears of an engine-driven apparatus, the casing having a base, the base defining a heat exchanger cavity and separating the heat exchanger cavity from the main cavity, an opening at an external surface of the base providing access to the heat exchanger cavity, the base includes an inlet port in communication with the heat exchanger cavity, and an outlet port wherefrom liquid exits the heat exchanger cavity, the casing further comprising an oil drain port in communication with the main cavity and positioned above the heat exchanger cavity.

17. The device of claim 16 where an entirety of the heat exchanger cavity is positioned below the main cavity.

18. A device comprising:
a casing defining a main cavity and housing a drive shaft of an engine-driven apparatus, the casing having an integrally connected base, the base defining a heat exchanger cavity and having a heat exchange web separating the heat exchanger cavity from the main cavity, an entirety of the heat exchanger cavity positioned below the main cavity, an inlet port in communication with the heat exchanger cavity, and an outlet port wherefrom liquid exits the heat exchanger cavity, an opening at an external surface of the base providing access to the heat exchanger cavity, the heat exchange web configured such that cooling liquid within the heat exchanger cavity contacts the web to exchange heat to cool lubricant within the main cavity.

19. The device of claim 18 where the device further includes a centrifugal pump driven by the drive shaft, and a liquid supply conduit providing communication between a casing of the pump and the inlet port.

20. The device of claim 18 where an upper surface of the web defines a main cavity floor within the main cavity, the main cavity floor slanted with respect to a central axis of the drive shaft.

21. A heat exchange system comprising:
an engine-driven apparatus;
a casing defining a main cavity for housing a drive shaft, bearings, or gears to drive the apparatus, the casing having an integrally connected base, the base defining a heat exchanger cavity and separating the heat exchanger cavity from the main cavity, an entirety of the heat exchange cavity positioned below the main cavity; and
a conduit in communication from a liquid supply port of the apparatus to a liquid inlet of the base, whereby lubricant used within the casing may be cooled with liquid from the apparatus.

22. The heat exchange system of claim 21 where the apparatus is a centrifugal pump and where the liquid supply port of the pump is in communication with a fluid flow path of the pump, which fluid flow path directs liquid from a path of the pump through a nozzle of the pump.

23. The heat exchange system of claim 22 where the main cavity houses a drive shaft and bearings, and the liquid supply port is positioned on a bearings side of the pump, the pump including a main pump drain positioned opposite the liquid supply port on an impeller side of the pump.

24. The system of claim 21 where the base includes an opening at a lowermost external surface of the base in communication with the heat exchanger cavity such that all liquid within the heat exchanger cavity may drain from the heat exchanger cavity by gravity.

25. The system of claim 21 further comprising an inlet port in communication with the heat exchanger cavity, an outlet port wherefrom liquid exits the heat exchanger cavity, and an opening at an external surface of the base providing access to the heat exchanger cavity.

26. The system of claim 21 where the heat exchanger cavity is an enclosed liquid heat exchanger cavity.

\* \* \* \* \*